(12) United States Patent
Huber

(10) Patent No.: US 10,759,463 B2
(45) Date of Patent: Sep. 1, 2020

(54) CLAMPING DEVICE OF AN ADJUSTABLE STEERING COLUMN FOR MOTOR VEHICLES

(71) Applicants: THYSSENKRUPP PRESTA AG, Eschen (LI); thyssenkrupp AG, Essen (DE)

(72) Inventor: Sebastian Huber, Göfis (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 292 days.

(21) Appl. No.: 15/754,214

(22) PCT Filed: Aug. 9, 2016

(86) PCT No.: PCT/EP2016/068969
§ 371 (c)(1),
(2) Date: Feb. 21, 2018

(87) PCT Pub. No.: WO2017/036748
PCT Pub. Date: Mar. 9, 2017

(65) Prior Publication Data
US 2018/0290680 A1    Oct. 11, 2018

(30) Foreign Application Priority Data
Aug. 28, 2015  (DE) .................. 10 2015 216 536

(51) Int. Cl.
*B62D 1/184*  (2006.01)
*B62D 1/18*   (2006.01)
(Continued)

(52) U.S. Cl.
CPC ............. *B62D 1/184* (2013.01); *B62D 1/189* (2013.01); *B62D 1/197* (2013.01)

(58) Field of Classification Search
CPC . B62D 1/18; B62D 1/184; B62D 1/19; B62D 1/192; B62D 1/197
See application file for complete search history.

(56) References Cited

U.S. PATENT DOCUMENTS 5,143,402 A  *  9/1992  Higashino .............. B62D 1/184
                                                         280/775
5,239,889 A      8/1993  Hancock
(Continued)

FOREIGN PATENT DOCUMENTS

CN    103339015 A    10/2013
CN    103702891 A    4/2014
(Continued)

OTHER PUBLICATIONS

English Translation of International Search Report issued in PCT/EP2016/068969, dated Oct. 28, 2016 (dated Nov. 9, 2016).

*Primary Examiner* — Barry Gooden, Jr.
(74) *Attorney, Agent, or Firm* — thyssenkrupp North America, LLC

(57) ABSTRACT

A clamping device may include clamping jaws that selectively clamp a steering column tube that is adjustable. A clamping pin may connect the clamping jaws. Rotation of the clamping pin in a closure direction causes the steering column tube to be clamped between the clamping jaws, and rotation of the clamping pin in an opening direction releases the clamping jaws for adjustment of the steering column tube. A damping member may be disposed on the clamping pin and connected to the clamping pin in a frictionally engaging or resilient manner. The damping member may comprise a stop tongue that protrudes radially from the clamping pin. When the clamping pin rotates in the opening direction, the stop tongue moves into abutment with the steering column tube and prevents rotation of the damping member so that the rotation of the clamping pin in the (Continued)

opening direction occurs counter to the friction force or resilient force and is damped.

16 Claims, 2 Drawing Sheets

(51) Int. Cl.
*B62D 1/19* (2006.01)
*B62D 1/189* (2006.01)

(56) References Cited

U.S. PATENT DOCUMENTS

| | | | | |
|---|---|---|---|---|
| 8,555,745 | B2* | 10/2013 | Inoue | B62D 1/195 |
| | | | | 280/775 |
| 10,308,275 | B2* | 6/2019 | Huber | B62D 1/184 |
| 2004/0084886 | A1 | 5/2004 | Yamamoto | |
| 2008/0202276 | A1 | 8/2008 | Harris | |
| 2009/0013818 | A1 | 1/2009 | Arbanas | |
| 2010/0186535 | A1 | 7/2010 | Scapozza | |
| 2010/0300236 | A1* | 12/2010 | Goulay | B62D 1/184 |
| | | | | 74/493 |
| 2011/0185839 | A1 | 8/2011 | Inoue | |
| 2013/0074641 | A1* | 3/2013 | Schnitzer | G05G 5/06 |
| | | | | 74/493 |
| 2014/0000405 | A1 | 1/2014 | Anspaugh | |
| 2015/0053041 | A1 | 2/2015 | Schnitzer | |
| 2015/0266499 | A1* | 9/2015 | Yoshihara | B62D 1/184 |
| | | | | 74/493 |
| 2017/0247046 | A1* | 8/2017 | Huber | B62D 1/184 |
| 2017/0355393 | A1* | 12/2017 | Okada | F16H 25/14 |
| 2018/0079443 | A1* | 3/2018 | Anspaugh | B62D 1/185 |
| 2019/0031224 | A1* | 1/2019 | Huber | B62D 1/185 |
| 2019/0047606 | A1* | 2/2019 | Dite | B62D 1/195 |

FOREIGN PATENT DOCUMENTS

| | | |
|---|---|---|
| DE | 10222070 A | 12/2002 |
| DE | 10304640 A | 8/2004 |
| DE | 102008029247 A | 12/2009 |
| DE | 102010000504 B | 3/2011 |
| DE | 102010050015 A | 5/2012 |
| DE | 202012102159 U | 7/2012 |
| DE | 102012209283 A | 12/2012 |
| DE | 102011056351 A | 6/2013 |
| DE | 102012112890 A | 1/2014 |
| DE | 102013107728 A | 7/2014 |
| DE | 102014016510 A | 2/2015 |
| DE | 102013109931 A | 3/2015 |
| EP | 0606085 A | 7/1994 |
| EP | 1681223 A | 7/2006 |
| EP | 1894812 A | 3/2008 |
| EP | 2738062 A | 6/2014 |
| KR | 20140065884 A | 5/2014 |
| WO | 2009121386 A | 10/2009 |
| WO | 2009141045 A | 11/2009 |
| WO | 2016074838 A | 5/2016 |

* cited by examiner

CLAMPING DEVICE OF AN ADJUSTABLE STEERING COLUMN FOR MOTOR VEHICLES

CROSS REFERENCE TO RELATED APPLICATIONS

This application is a U.S. National Stage Entry of International Patent Application Serial Number PCT/EP2016/068969, filed Aug. 9, 2016, which claims priority to German Patent Application No. DE 10 2015 216 536.1, filed Aug. 28, 2015, the entire contents of both of which are incorporated herein by reference.

FIELD

The present disclosure generally relates to steering columns, including clamping devices of adjustable steering columns in motor vehicles.

BACKGROUND

With regard to clamping devices for steering columns, a problem arises that an actuation lever which is connected to the clamping pin in a rotationally secure manner has, in the event of a movement in the closure direction, to apply the force which is required for clamping the clamping jaws. In the event of a movement of the clamping lever in the opening direction, the forces mentioned act in the opposing direction on the actuation lever which can therefore release itself from the grip of the operator and can strike a stop in the opening direction. The service-life of the clamping device is thereby reduced and noises which are perceived to be unpleasant occur.

In order to prevent the problem mentioned, damping devices which damp the movement of the actuation lever from the closure position into the opening position and which prevent disruptive noises are known.

EP 2 738 062 A2 discloses a damping device in which a cam member which is arranged on a clamping pin during the movement into the open lever position further pretensions a weight compensation spring of the steering column and consequently carries out a damping operation. The disadvantage of this solution is that the damping is dependent on the height adjustment position since the weight compensation spring is pretensioned to different extents in different height adjustment positions.

DE 20 2012 102 159 U1 discloses a damping device with a fluid damper. The disadvantage of this is the complex construction and the use of fluid.

Thus a need exists for an improved damping device for a clamping device of a steering column which has a simple and cost-effective construction.

DETAILED DESCRIPTION

Figure 1:
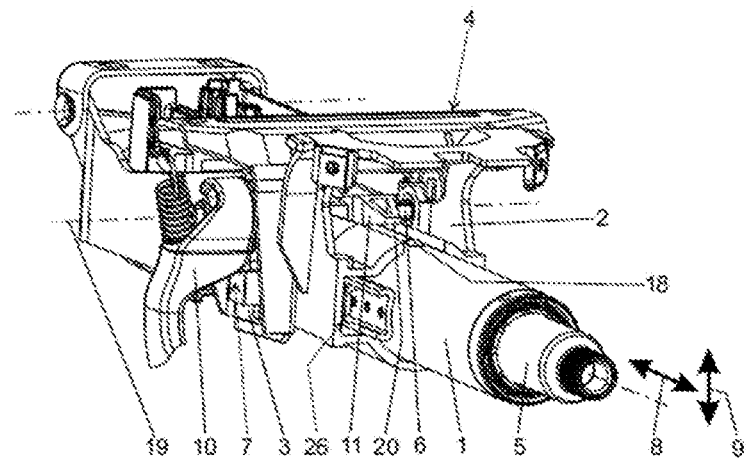
FIG. 1 is a perspective view of an example adjustable steering column for motor vehicles with a clamping device in a closed state.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to clamping devices of adjustable steering columns for motor vehicles. In some examples, a carrier that is securely connected to a vehicle chassis is connected to two clamping jaws that surround the steering column. Between the clamping jaws may be a steering column tube that can be longitudinally and/or vertically adjusted and that rotatably supports a steering spindle. Such an example clamping device may further include a clamping pin that connects the two clamping jaws and that cooperates with a clamping retention device arranged on at least one of the two clamping jaws in such a manner that, in the event of a rotation of the clamping pin about a pin axis in a closure direction, the clamping retention device clamps the steering column tube between the two clamping jaws and, in the event of a rotation in the opening direction, releases the clamping jaws so that the steering column tube can be adjusted.

In some examples, a damping member may be arranged on a clamping pin and may be connected to the clamping pin in a frictionally engaging or resilient manner. The damping member may have a stop tongue that protrudes radially from the clamping pin and which, when the clamping pin is rotated in an opening direction, moves into abutment with the steering column tube or another component of the steering column and prevents a rotation of the damping member so that the rotation of the clamping pin in an opening direction is carried out counter to the friction force or resilient force and is damped.

The clamping device according to the invention has the advantage that it is, on the one hand, independent of the adjustment position of the steering column and, on the other hand, comprises a simple and cost-effective structure. In the simplest case, the damping member comprises a hole through which the clamping pin extends, wherein the diameter of the hole and the clamping pin are adapted to each other in such a manner that, with a relative rotation of the clamping pin with respect to the damping member, a defined friction force has to be overcome. As a result of the friction, the elastic energy which is released by the clamping jaws during the opening operation and which leads to an acceleration of the rotation movement of the clamping pin in an opening direction and the actuation lever which is connected to the clamping pin is absorbed by means of friction of the clamping pin on the damping member so that the movement is braked and the actuation lever reaches the stop thereof at a very low speed. Unpleasant noises are thereby prevented in the same manner as premature wear of the clamping device.

In an advantageous embodiment, the damping member comprises a plastics material or an elastomer material. Preferably, the damping member is formed completely by the plastics material or the elastomer material. This affords the advantage that improved damping can be achieved.

In an embodiment of the notion of the invention, there is provision for the resilient connection between the damping member and clamping pin to be produced by means of a resilient deformation of the damping member. If the damping member itself is resiliently deformed, no additional components provided for this purpose are required.

In a first construction variant of the embodiment mentioned, the resilient deformation is a deformation of the stop tongue. The stop tongue which protrudes radially from the clamping pin can be formed for this purpose from relatively thin material so that it is initially placed against the steering column tube and with a further rotation of the clamping pin and the damping member bends, whereby it applies to the clamping pin a torque counter to the opening rotation direction.

In a second variant of the above-mentioned embodiment, the resilient deformation may also be achieved by expanding a region of the damping member partially surrounding the clamping pin, in particular by means of a cam of the clamping pin. In this instance, any cross-sectional shape of the pin which deviates from the circular form is suitable in principle in combination with a correspondingly formed counter-face of the damping member.

In a particularly preferred embodiment, the clamping device according to the invention besides the damping action may also perform an additional function. Advantageous in this regard is the feature combination that the steering column tube is provided with a fixed longitudinal stop and that the damping member comprises at the end of the stop tongue thereof a stop face which, when the clamping retention device is open, is opposite the longitudinal stop so that a longitudinal displacement of the steering column tube toward the vehicle front is limited by the stop face stopping against the longitudinal stop, and which, when the clamping retention device is closed, is located above the longitudinal stop so that, in the event of an accident of the motor vehicle, the steering column tube can with the friction force of the clamping jaws being overcome be displaced in the direction of the vehicle front beyond the longitudinal stop. In this embodiment, the stop tongue of the damping member which is present in any case together with a longitudinal stop which is secured to the steering column tube takes up the function of a limitation of the longitudinal adjustment which can be switched on and off and which in the case of the intentional longitudinal adjustment by the driver is effective when the clamping retention device is open and remains switched off when the clamping retention device is closed in order to enable further displacement of the steering column beyond the normal adjustment range in the longitudinal direction in the event of an accident.

Clamping retention devices are adequately known from the prior art, for example, as a wedge disk/cam disk clamping retention device in which a cam disk which is connected to the actuation lever is rotated with respect to a non-rotatable wedge disk, whereby a clamping stroke brings about the clamping retention of the clamping jaws. Furthermore, there are known from the prior art tilting pin clamping retention devices and ball or roller clamping retention devices. This exemplary listing of the clamping retention devices is, however, not intended to be understood to be a limitation to one type of clamping retention devices. The solution according to the invention is consequently not limited to the clamping retention devices mentioned.

In order to enable a rotation of the damping member together with the clamping pin over a small rotation angle range, which is required for switching off the limitation of the longitudinal adjustment and to prevent further rotation of the damping member even when the clamping pin rotates further in the closure direction, another embodiment of the invention is provided in which the damping member comprises a resilient element which protrudes radially from the clamping pin in a direction counter to the stop tongue and rests against the steering column tube or another component of the steering column so that, in the event of a rotation of the clamping pin in the closure direction, the rotational movement of the damping member is limited in such a manner that the stop face of the stop tongue is located outside the effective region of the longitudinal stop. In an advantageous development, the resilient element and the damping member may be constructed as an integral single-piece component, preferably of plastics material.

The last-mentioned embodiment of the invention with switchable limitation of the longitudinal adjustment of the steering column can be even further improved in that the resilient deformation of the damping member brings about an increase of the spacing between the pin axis and stop face of the stop tongue. This measure has the advantage that the stop face of the stop tongue when the clamping retention device is closed is always first moved a small distance away from the longitudinal stop in the direction toward the pin axis before the stop face rotates together with the damping member and the clamping pin, wherein the stop face moves upward out of the region of the longitudinal stop. If the clamping retention device is subsequently opened again, the stop face moves as a result of the rotation of the damping member with the clamping pin initially downward into the region of the longitudinal stop and, with a further rotation of the clamping pin in the opening direction, the damping member is prevented from further rotation and becomes resiliently deformed, whereby the spacing between the stop face and pin axis is further increased until the stop face in an extreme case is again in abutment with the longitudinal stop. Without the shortening of the spacing between the pin axis and stop face when the clamping retention device is closed, the end of the stop tongue when the clamping retention device is opened could come to rest on the longitudinal stop so that the stop face is also located above the longitudinal stop and consequently a limitation of the adjustment path in the longitudinal direction is no longer provided.

A simple embodiment of the resilient deformation of the damping member according to the invention involves the stop tongue being bent from the region of the clamping pin in the direction toward the steering column tube and, when the stop tongue is in abutment with the steering column tube and the clamping pin is rotated further in the opening direction, the stop tongue being bent up so that the spacing of the stop face from the pin axis is increased.

Figure 2:
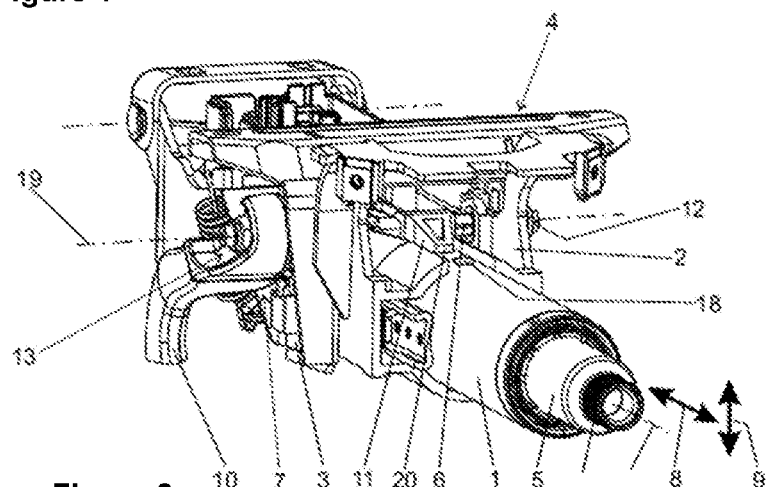
FIG. 2 is a perspective view of the steering column of FIG. 1, but with the clamping device in an open state.
Figure 3:
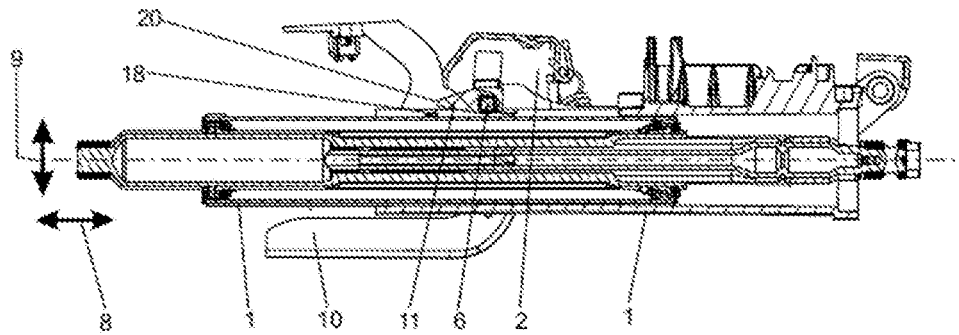
FIG. 3 is a longitudinal sectional view of the steering column of FIGS. 1 and 2.

As can be seen in FIGS. 1 and 2, the steering column shown is secured to the vehicle chassis which is not shown by means of a carrier 4, which also carries two clamping jaws 2, 3 which can be clamped together by means of the clamping device according to the invention. There is securely clamped in this instance a steering column tube 1 which rotatably supports a multi-component steering spindle 5 which can be moved apart and together in the longitudinal direction 8 in the manner of a telescope. The steering column tube 1 itself can when the clamping device is open also be pushed forward and backward in the longitudinal direction 8. Furthermore, the steering column tube 1 with the clamping device open can be moved upward and downward in a vertical direction 9. When the steering column tube 1 is securely clamped between the clamping jaws 2, 3 by means of the clamping device according to the invention, it can be moved neither in the longitudinal direction 8 nor in the vertical direction 9.

The clamping device comprises a clamping pin 6 which cooperates with a clamping retention device 7 in order to move the two clamping jaws 2, 3 toward each other so that they clamp the steering column tube 1 securely between them. Between the steering column tube 1 and the carrier 4 there is provided an energy absorption device 26 which cooperates with the clamping retention device 7 in such a manner that in the open clamping device a force flow through the energy absorption device 26 is interrupted so that an adjustment of the steering column tube 1 can be carried out and with the closed clamping device a force flow is produced so that, in the event of a vehicle front-end collision, the steering column tube 1 can be displaced relative to the carrier 4 with energy absorption, for example, by means of deformation of a bending wire.

The clamping pin 6 connects the two clamping jaws 2, 3 and is connected at one end 13 thereof to an actuation lever 10 which can be rotated about the pin axis 19. Another end of the clamping pin 6 is screwed to the clamping jaw 2 by means of a nut 12. The actuation lever 10 acts together with the clamping pin 6 on a clamping retention device 7 in such a manner that, when the actuation lever 10 is rotated in the closure direction 14 about the pin axis 19, the two clamping jaws 2, 3 securely clamp the steering column tube 1 and, when the actuation lever 10 is rotated in the opening direction 15 (counter to the clamping or closure direction), the clamping jaws 2, 3 release the steering column tube 1 for the steering column adjustment in the longitudinal direction 8 and in the vertical direction 9.

Figure 4:
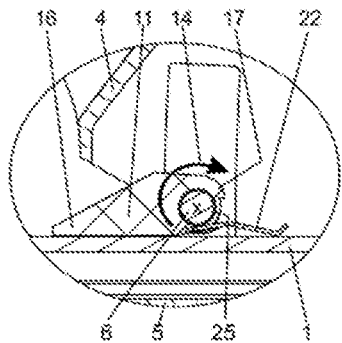
FIG. 4 is a detail view of an example damping member of a clamping device in an open state.
Figure 5:
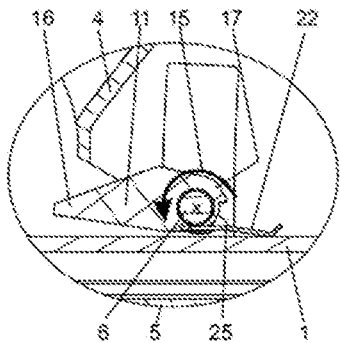
FIG. 5 is a detail view of an example damping member of a clamping device in a closed state.

FIGS. 4 and 5 show a damping member 11 according to the invention in a first embodiment. The damping member 11 comprises a through-hole 25 through which the clamping pin 6 extends. In this instance, the diameter of the hole 25 and the outer diameter of the clamping pin 6 are adapted to each other in such a manner that a clamping connection is produced and the clamping pin 6 is connected to the damping member 11 in a frictionally engaging manner. The damping member 11 comprises a stop tongue 16 which protrudes radially from the clamping pin 6 and which, when the clamping pin 6 is rotated in an opening direction 15, moves into abutment with the steering column tube 1, wherein the rotation movement of the damping member 11 is stopped. If the clamping pin 6 now rotates further in the opening direction 15, the peripheral face thereof rubs on the inner face of the hole 25 of the damping member 11. The rotational movement of the clamping pin 6 therefore has to overcome the friction force, wherein the movement energy of the clamping pin 6 and the actuation lever 10 which is connected thereto is absorbed. This leads to a damping of the rotational movement.

Figure 7:
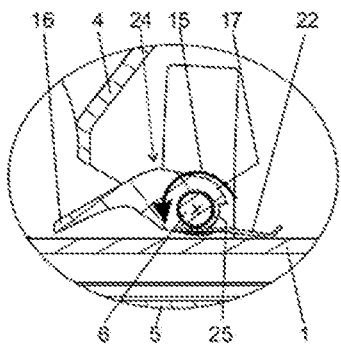
FIG. 7 is a detail view of another example damping member of a clamping device in a closed state.
Figure 10:
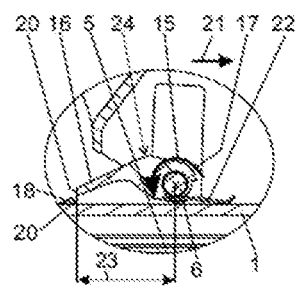
FIG. 10 is a detail view similar to FIG. 8, but in a closed state.

A resilient element 22 is secured to the damping member 11 and furthermore also to the modified damping member 24 according to an embodiment of the invention which is described below. The resilient element 22 protrudes radially from the clamping pin 6 in the opposite direction to the stop tongue 16 of the damping member 11. The resilient element 22 is also in abutment against the steering column tube 1 and in this manner prevents a larger rotational movement of the damping member 11, 24 if the clamping pin 6 rotates in the closure direction 14. As can be seen in FIGS. 5, 7 and 10, the free end of the stop tongue 16 is lifted only a few millimeters from the steering column tube 1 in this case.

Figure 6:
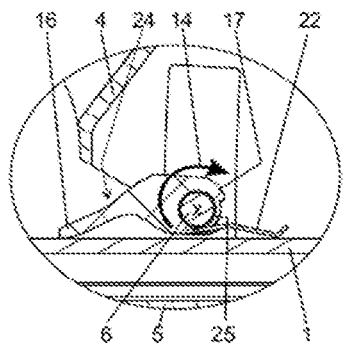
FIG. 6 is a detail view of another example damping member of a clamping device in an open state.

As can be seen in FIGS. 6 and 7, a modified damping member 24 also comprises a stop tongue 16 but one which is constructed with a relatively small material thickness so that it can be resiliently bent. The stop tongue 16 starting from the clamping pin 6 is bent in the direction toward the steering column tube 1. If the clamping pin 6 is rotated in the opening direction 15, the end of the stop tongue 16 moves into abutment with the steering column tube 1 (FIG. 6). If the clamping pin 6 now rotates even further in the opening direction 15, the stop tongue 16 is resiliently deformed. A portion of the rotation and movement energy of the clamping pin 6 and the actuation lever 10 which in turn originates from the resilient return deformation of the clamping jaws 2, 3 is thereby used to deform the stop tongue 16, whereby the movement of the clamping pin 6 and the actuation lever 10 is damped.

In an alternative embodiment, which is not illustrated in detail here, a region 17 of the damping member 24 which surrounds the clamping pin 6 and which of course must not be completely closed can be resiliently deformed by means of expansion, for example, by means of a cam (not shown) of the clamping pin 6. In this instance, a portion of the movement energy of the clamping pin 6 and the actuation lever 10 would also be used by the resilient deformation of the region 17 and the movement would be damped.

Figure 8:
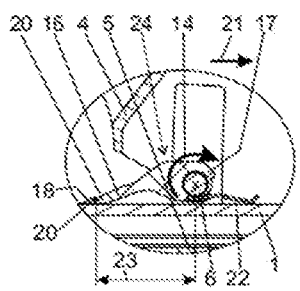
FIG. 8 is a detail view of an example damping member of a clamping device with a longitudinal stop in an open state.
Figure 9:
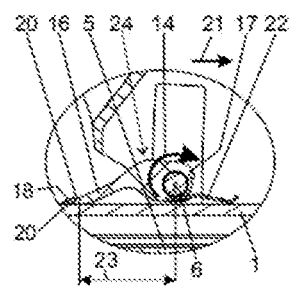
FIG. 9 is a detail view similar to FIG. 8, but in a transition stage between an open state and a closed state.

A preferred embodiment which is illustrated in FIGS. 8 to 10 of the invention provides for a longitudinal stop 18 which is secured to the steering column tube 1. The stop tongue 16 of the damping member 24 comprises at the free end thereof a stop face 20 which is intended to stop against the longitudinal stop 18 of the steering column tube 1. When the clamping retention device 7 is open as shown in FIG. 8, the stop face 20 of the stop tongue 16 is generally located with greater spacing from the longitudinal stop 18 of the steering column tube 1. If the driver now adjusts the steering column in the direction 21 toward the front of the vehicle, the longitudinal stop 18 is displaced together with the steering column tube 1 in the direction 21 until it strikes the stop face 20 of the stop tongue 16 and prevents further displacement of the steering column tube 1 in the direction 21 toward the vehicle front.

If, in contrast, as shown in FIG. 10, the clamping retention device 7 is closed and locked, the stop tongue 16 is a few millimeters away from the steering column tube 1 above the longitudinal stop 18 and consequently outside the effective region of the longitudinal stop 18. If a vehicle accident arises in this situation, the steering column tube 1 can move further in the direction 21 toward the vehicle front without the longitudinal stop 18 thereof coming into contact with the stop face 20 of the stop tongue 16. The casing sleeve 1 can thus after overcoming the friction force of the clamping jaws 2, 3 be displaced in the direction 21 beyond the longitudinal stop 18, wherein the energy absorption device 26 can be used to convert the impact energy which is introduced by the driver into the steering wheel in a selective manner into deformation work by means of the deformation of the energy absorption element in a controlled manner. This is an important safety aspect since it prevents the steering column and the steering wheel from being displaced in the direction of the driver as a result of the crash.

The spring 22 in this embodiment ensures that the damping member 24 can rotate in the closure direction 14 until the end of the stop tongue 16 thereof is lifted from the effective region of the longitudinal stop 18 of the steering column tube 1.

In FIG. 9, an intermediate position between the completely open state of the clamping retention device 7 shown in FIG. 8 and the completely closed state shown in FIG. 10 is illustrated. In this instance, it can be seen that, as a result of the above-described resilience of the stop tongue 16, the stop face 20 in the partially closed state of the clamping retention device 7 comprises a small spacing (gap) with respect to the longitudinal stop 18 of the steering column tube 1. If the clamping pin 6 is rotated from the intermediate position shown in FIG. 9 into the completely open position of FIG. 8, the stop tongue 16 becomes deformed by being bent. In this instance, the spacing 23 between the pin axis 19 and the longitudinal stop 18 increases so that the gap between the stop face 20 of the stop tongue 16 and the longitudinal stop 18 of the steering column tube 1 closes.

The gap is important when, in the open state of the clamping retention device 7 according to FIG. 8, the steering column and consequently the steering column tube 1 is adjusted until the longitudinal stop 1 is in abutment with the stop face 20. If the stop tongue 16 were now not resiliently deformed back when the clamping retention device 7 is closed, the gap mentioned could not be produced. Instead, the stop tongue 16 under some circumstances would move counter to a friction force which occurs between the stop face 20 and the longitudinal stop 18 in the closure direction 14, that is to say, in an upward direction. If the clamping retention device 7 is subsequently opened again, the end of the stop tongue 16 could come to rest on the upper side of the longitudinal stop 18 and the stop face 20 could be unable to strike the longitudinal stop 18. However, there would then, even in the open state of the clamping retention device 7, not be produced any limitation of the longitudinal movement of the steering column tube 1 in the direction 21 toward the vehicle front and the steering column would be able to be adjusted into an inadmissible region.

In order to prevent this, the stop tongue 16 of the damping member 24 is constructed in a resilient manner.

LIST OF REFERENCE NUMERALS

1 Steering column tube
2 Clamping jaws
3 Clamping jaws
4 Carrier
5 Steering spindle
6 Clamping pin
7 Clamping retention device
8 Longitudinal direction
9 Vertical direction
10 Actuation lever
11 Damping member
12 Nut
13 End
14 Closure direction
15 Opening direction
16 Stop tongue
17 Region
18 Longitudinal stop
19 Pin axis
20 Stop face
21 Direction/Longitudinal displacement
22 Resilient element
23 Spacing
24 Damping member
25 Hole

What is claimed is:

1. A clamping device of an adjustable steering column for a motor vehicle, the clamping device comprising:
   a carrier configured to be connected to a vehicle chassis of the motor vehicle;
   two clamping jaws coupled to the carrier, the two clamping jaws being configured to clamp a steering column tube that has a fixed longitudinal stop disposed thereon, that rotatably supports a steering spindle, and that is at least one of longitudinally or vertically adjustable;
   a clamping pin that connects the two clamping jaws;
   a clamping retention device disposed on and cooperating with at least one of the two clamping jaws such that,
      rotation of the clamping pin about a pin axis in a closure direction causes the clamping retention device to clamp the steering column tube between the two clamping jaws, and
      rotation of the clamping pin about the pin axis in an opening direction releases the clamping retention device and the two clamping jaws and permits adjustment of the steering column tube; and
   a damping member disposed on the clamping pin and connected to the clamping pin in a frictionally engaging or resilient manner, and having a stop tongue radially protruding away from the clamping pin,
      wherein the damping member is configured such that the rotation of the clamping pin in the opening direction moves the stop tongue into abutment with the steering column tube or another part of the adjustable steering column and prevents the rotation of the damping member so that the rotation of the clamping pin in the opening direction occurs counter to a friction force or a resilient force and is damped,
      wherein the damping member further has a stop face defined at an end of the stop tongue that is configured to be positioned at least one of,
         opposite the fixed longitudinal stop of the steering column tube when the clamping retention device is in an open position, so that a longitudinal displacement of the steering column tube toward a front of the motor vehicle is limited by the stop face stopping against the fixed longitudinal stop, and
         above the fixed longitudinal stop of the steering column tube when the clamping retention device is in a closed position, so that during a crash event, when a force acting on the steering column tube overcomes an opposing friction force of the two clamping jaws and the steering column tube is displaced toward the front of the motor vehicle, the fixed longitudinal stop can be longitudinally displaced past the stop face.

2. The clamping device of claim 1, wherein the stop tongue is configured to be resiliently deformed after being moved into abutment with the steering column tube and subjected to further of the rotation of the clamping pin in the opening direction.

3. The clamping device of claim 1, wherein the damping member comprises a resilient element that protrudes radially from the clamping pin in a direction counter to the stop tongue and lies against at least some part of the adjustable steering column so that in an event of the rotation of the clamping pin in the closure direction, a rotational movement of the damping member is limited so that the stop face of the stop tongue is disposed outside an effective region of the fixed longitudinal stop.

4. The clamping device of claim 1, wherein the damping member is configured such that deformation of the damping member increases a distance between the pin axis and the stop face of the stop tongue.

5. The clamping device of claim 4, wherein the stop tongue is bent from a region of the clamping pin toward the steering column tube, and is configured such that when the stop tongue abuts the steering column tube or the another part of the adjustable steering column and the clamping pin is rotated further in the opening direction, the stop tongue is bent so that the distance between the stop face and the pin axis increases.

6. The clamping device of claim 1, wherein a connection between the damping member and the clamping pin is a resilient connection formed by a resilient deformation of the damping member proximate the connection.

7. The clamping device of claim 6 wherein the resilient deformation is an expanded region of the damping member partially surrounding the clamping pin.

8. The clamping device of claim 6, wherein the stop tongue is shaped such that a resilient deformation of the stop tongue increases a distance between the pin axis and the stop face of the stop tongue.

9. The clamping device of claim 8, wherein the stop tongue is bent from a region of the clamping pin toward the steering column tube, and is configured such that when the stop tongue abuts the steering column tube or the another part of the adjustable steering column and the clamping pin is rotated further in the opening direction, the stop tongue is bent so that the distance between the stop face and the pin axis increases.

10. A clamping device for a steering column of a motor vehicle, comprising:
clamping jaws that are configured to selectively clamp a steering column tube that has a fixed longitudinal stop and is at least one of longitudinally or vertically adjustable;
a clamping retention device disposed on at least one of the clamping jaws that is selectively movable between a closed position and an open position;
a clamping pin that connects the clamping jaws and cooperates with the clamping retention device, wherein rotation of the clamping pin in a first direction causes the clamping retention device to move to the closed position and clamp the steering column tube between the clamping jaws, and rotation of the clamping pin in a second direction causes the clamping retention device to move to the open position to release the steering column tube from the clamping jaws and permits adjustment of the steering column tube; and
a damping member that is disposed on the clamping pin, and is connected to the clamping pin in a frictionally engaging or resilient manner, the damping member comprising a stop tongue radially protruding from the clamping pin, which stop tongue has a stop face defined at an end thereof that is configured to be positioned at least one of,
opposite the fixed longitudinal stop of the steering column tube when the clamping retention device is in the open position, so that a longitudinal displacement of the steering column tube toward a front of the motor vehicle is limited by the stop face stopping against the fixed longitudinal stop, and
above the fixed longitudinal stop of the steering column tube when the clamping retention device is in the closed position, so that during a crash event, when a longitudinal force acting on the steering column tube overcomes an opposing friction force of the clamping jaws and the steering column tube is displaced toward a front of the motor vehicle, the fixed longitudinal stop can be longitudinally displaced past the stop face without contacting the stop face, and
wherein the rotation of the clamping pin in the second direction moves the stop tongue into abutment with a part of the steering column and prevents the rotation of the damping member so that the rotation of the clamping pin in the second direction is damped and occurs counter to a friction force or a resilient force.

11. The clamping device of claim 10, wherein the stop tongue is configured to be resiliently deformed after being moved into abutment with the steering column tube and subjected to further of the rotation of the clamping pin in the opening direction.

12. The clamping device of claim 10 wherein the damping member comprises a resilient element that protrudes radially from the clamping pin in a direction counter to the stop tongue and lies against the steering column tube so that in an event of rotation of the clamping pin in the first direction, a rotational movement of the damping member is limited so that the stop face of the stop tongue is disposed outside an effective region of the fixed longitudinal stop.

13. The clamping device of claim 10 wherein a connection between the damping member and the clamping pin is a resilient connection formed by a resilient deformation of the damping member.

14. The clamping device of claim 13 wherein the resilient deformation is an expanded region of the damping member partially surrounding the clamping pin.

15. The clamping device of claim 10, wherein deformation of the damping member increases a distance between an axis of the clamping pin and the stop face of the stop tongue.

16. The clamping device of claim 15, wherein the stop tongue is bent from a region of the clamping pin toward the steering column tube, and is configured such that when the stop tongue abuts the steering column tube and the clamping pin is rotated further in the second direction, the stop tongue is bent so that the distance between the stop face and the axis of the clamping pin increases.

* * * * *